(12) United States Patent
Saha et al.

(10) Patent No.: US 8,108,627 B2
(45) Date of Patent: Jan. 31, 2012

(54) ARRAY COMPARISON AND SWAP OPERATIONS

(75) Inventors: Bratin Saha, San Jose, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 11/395,410

(22) Filed: Mar. 31, 2006

(65) Prior Publication Data

US 2007/0233970 A1 Oct. 4, 2007

(51) Int. Cl.
*G06F 12/00* (2006.01)
*G06F 11/00* (2006.01)

(52) U.S. Cl. ......... 711/152; 711/E12.103; 711/E12.069; 714/54

(58) Field of Classification Search .................... 711/152
See application file for complete search history.

(56) References Cited

U.S. PATENT DOCUMENTS

| | | | |
|---|---|---|---|
| 6,466,825 B1 | 10/2002 | Wang et al. | |
| 6,644,495 B2 | 11/2003 | Ruskin et al. | |
| 6,772,255 B2* | 8/2004 | Daynes | 710/200 |
| 6,823,511 B1* | 11/2004 | McKenney et al. | 718/102 |
| 2002/0078284 A1* | 6/2002 | McKenney | 710/200 |
| 2003/0140177 A1* | 7/2003 | Arajs et al. | 709/315 |
| 2004/0006674 A1 | 1/2004 | Hargis et al. | |
| 2004/0230737 A1* | 11/2004 | Burton et al. | 711/3 |
| 2006/0010077 A1 | 1/2006 | Dohrmann et al. | |
| 2006/0085591 A1* | 4/2006 | Kumar et al. | 711/113 |

FOREIGN PATENT DOCUMENTS

WO 2007/123756 A1 11/2007

OTHER PUBLICATIONS

Coghian et al. (UK Patent Application GB 2,272,549 A), May 5, 1994, pp. 1-24.*
Bratin Saha et al., (McRT-STM: A High Performance Software Transactional Memory System for a Multi-Core Runtime), Mar. 29-31, 2006, pp. 187-197.*
International Preliminary Report on Patentability for Patent Application No. PCT/US2007/008009, mailed Oct. 9, 2008, 8 pages.
International Search Report and Written Opinion of the International Search Authority from PCT/US2007/008009 mailed Sep. 12, 2007; 10.

(Continued)

*Primary Examiner* — Hetul Patel
*Assistant Examiner* — Christopher Birkhimer
(74) *Attorney, Agent, or Firm* — Michael R. Barre

(57) ABSTRACT

A transactional memory system, method and apparatus are disclosed. An embodiment of the method includes attempting to acquire a write lock provided by an implementation of a software transactional memory (STM) system for each of a set of memory locations of the STM; if a write lock is acquired for each of the set of memory locations, comparing the value in each of the set of memory locations to a corresponding expected value; and if the comparing yields the same, predetermined result for each of the set of memory locations, storing in each memory location a corresponding new value. Other embodiments are also described and claimed.

25 Claims, 2 Drawing Sheets

OTHER PUBLICATIONS

Extended European Search Report received for EP Patent Application No. 07754521.8, mailed on Sep. 29, 2010, 5 pages of Office Action.

Saha, Bratin, "McRT-STM: A High Performance Software Transactional Memory System for a Multi-Core Runtime", Mar. 29-31, 2006, pp. 187-197.

Fraser, Keir, "Practical lock-freedom", Technical Report, Computer Laboratory, University of Cambridge, Feb. 2004, pp. 1-116.

Office Action received for European Patent Application No. 07754521.8, mailed on Jun. 6, 2011, 4 pages.

Notice of Allowance received for Chinese Application No. 200780012449.8, mailed on Jan. 11, 2011, 2 pages of English Translation and 2 pages of Notice of Allowance.

Office Action received for Chinese Application No. 200780012449.8, mailed on Apr. 14, 2010, 7 pages of English Translation and 4 pages of Office Action.

Office Action received for Chinese Application No. 200780012449.8, mailed on Sep. 1, 2010, 4 pages of English Translation and 3 pages of Office Action.

* cited by examiner

US 8,108,627 B2

ARRAY COMPARISON AND SWAP OPERATIONS

BACKGROUND

Software Transactional Memory (STM) Systems are known in the art. In general, these systems provide primitives useful for concurrent programming and other applications that allow a program to designate a set of actions as a transaction, in that the actions within the transaction execute atomically. Typically, the primitives include commands or calls to begin a transaction, to terminate a transaction normally, and to abort a transaction and roll back all effects of the aborted transaction. Many known implementations of STM systems exist. STM systems are implemented in software and so may be distinguished from hardware-based transactional memory (HTM) systems.

A useful primitive for use in concurrent programs is atomic Multi-Word Compare and Swap (MCAS). This primitive executes atomically. It compares the values in a set of memory locations in memory with a provided corresponding set of values. If each provided value matches the corresponding value in memory, the MCAS primitive then stores a provided set of new values into the set of memory locations, and returns a completion code indicating success; otherwise, no changes are made to memory and MCAS returns a completion code indicating failure. Existing implementations of MCAS such as Fraser, Practical Lock Freedom (Keir Fraser, Practical Lock Freedom, PhD. dissertation) use pointer values, and either logging or buffering of updates (during the MCAS operation) to ensure atomicity. Such buffering or logging adds overhead to such MCAS implementations.

DETAILED DESCRIPTION

Figure 1:
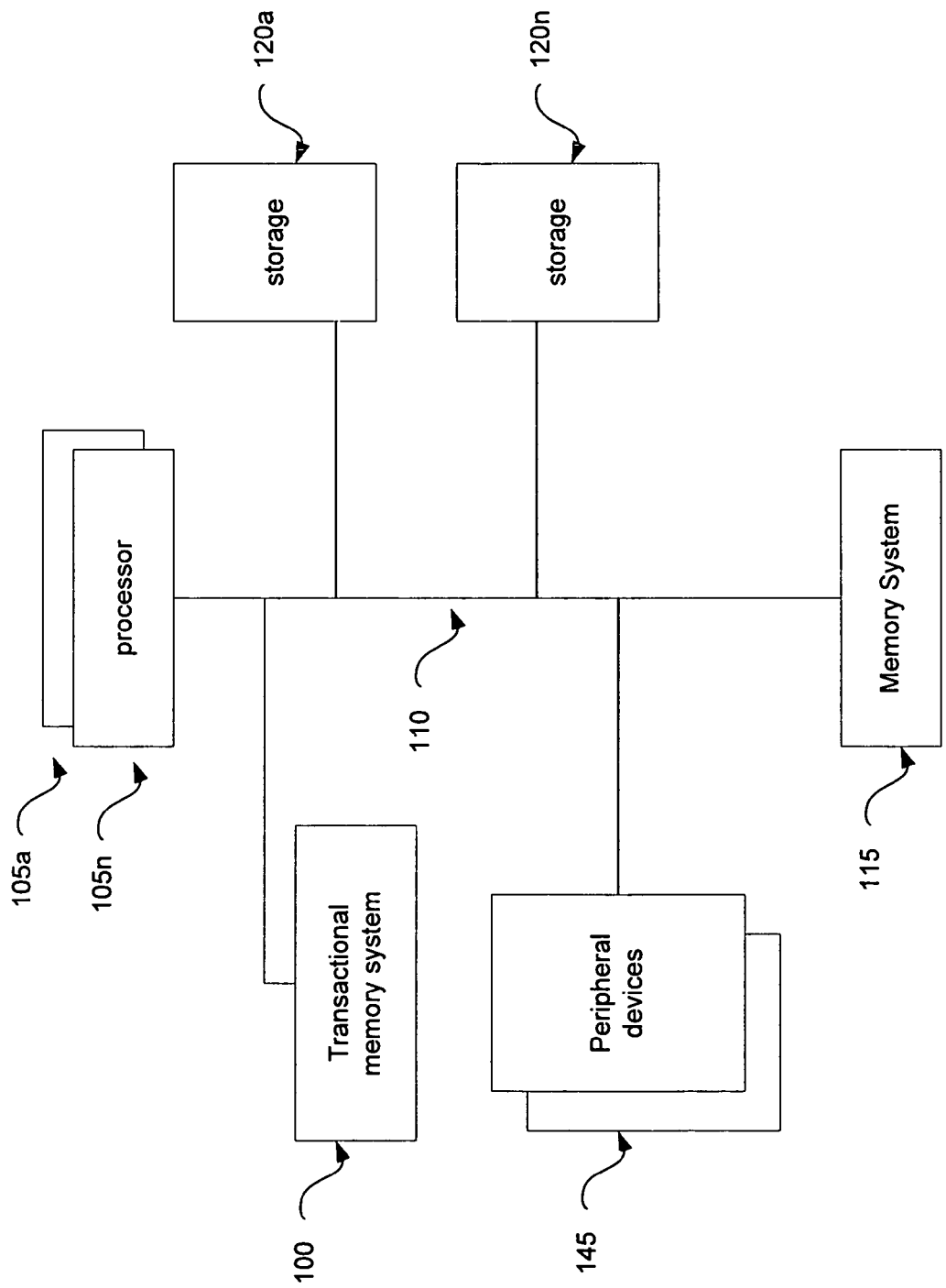
FIG. 1 depicts a processor-based system in one embodiment.

Referring to FIG. 1, a processor based system as shown may include one or more processors 105*a*, 105*n* coupled to a bus 110. Alternatively the system may have a processor that is a multi-core processor, or in other instances, multiple multi-core processors. In some embodiments the processor may be hyperthreaded, or able to perform in a manner as if it is a multi-core processor despite having only a single core. In a simple example, the bus 110 may be coupled to system memory 115, storage devices such as disk drives or other storage devices 120*a*, 120*n*, and peripheral devices 145. The storage 120*a* 120*n* may store various software or data. The system may be connected to a variety of peripheral devices 145 via one or more bus systems. Such peripheral devices may include displays and printing systems, among many others, as is known.

The system of FIG. 1 is only an example and the present invention is not limited to any particular architecture. Variations on the specific components of the systems of other architectures may include the inclusion of transactional memory as a component of a processor or processors of the system in some instances; in others, it may be a separate component on a bus connected to the processor. In other embodiments, the system may have additional instructions to manage lock free transactions. The actual form or format of the instructions in other embodiments may vary. Additional memory or storage components may be present. A large number of other variations are possible.

In one embodiment, functionality provided to support a general software transactional memory (STM) implementation, may be used to provide an MCAS operation as part of the software of a system such as that depicted in FIG. 1. Specifically, the MCAS operation may use reader-writer locks maintained by an STM to implement the underlying concurrency control required for transactions.

Some features of an instance of an STM system used in this embodiment are next described at a high level. This STM implementation maintains an array of reader-writer locks. A reader-writer lock is a lock that allows multiple readers to acquire access to the lock and then to read a memory location; but only allows a single writer to obtain access to the lock and then to write to the memory location. Every memory location in use by the STM is mapped to a unique reader-writer lock. The number of unique reader-writer locks maintained by the STM will depend on the mapping function. In one instance, an implementation may use a hashing function that masks off the lower bits of an address, e.g. six bits, as a mapping function to get a cache line address corresponding to a memory location at that address. The cache line address can then be used as an index into an array of reader-writer locks.

Thus, for example, if a program being executed by a processor attempts a transactional read from a memory location using the services of the STM, at an address A, the STM system first computes a hash of the address of that memory location. The STM system then computes the reader-writer lock corresponding to the hash, L. The system then tries to acquire a read lock on L. If the STM system succeeds, the STM system then returns the value at location A and stores an indication into the transaction-local read set that the STM system has obtained a read lock on L. Similarly, if the program attempts a transactional write to a memory location using the services of an STM, at an address A, the STM computes the reader-writer lock, L as before, and then tries to acquire an exclusive write lock on L. If STM system succeeds, the STM system then updates the memory location A and keeps a copy of the old value of A in a log, in case the transaction has to be rolled back. In addition, the STM system also stores an indication into a transaction-local write set that the STM system has acquired a write lock on L.

If implementation of a transaction by the STM system fails to acquire either a reader or writer lock in this implementation, the STM system retries after a back-off period, which may be a randomly determined period of time. A fixed number of retries is allowed, after which the STM system aborts the transaction and all locks are released. A counter may be used to track the number of retries in some embodiments. Any memory locations modified after the start of the transaction are also returned to their original value, based on the logs that have been maintained by the STM system for this transaction. This abort mechanism is intended to prevent deadlocks.

If the transaction successfully acquires all necessary locks and completes processing, the STM system then releases all locks, and discards all logged values. This marks a successful commit of the transaction in this STM system.

As previously discussed, an MCAS primitive provides an atomic way for a program to test whether a set of values in-memory matches a predetermined set of values provided as a parameter to the MCAS function, and to swap out the values in the in-memory set for a replacement set of values passed in as a parameter if the comparison yields a positive result, i.e. the predetermined set of values is the same as the set of values in memory. In one embodiment, an MCAS primitive may be implemented by a system that also provides a STM, using the underlying mechanisms that are used to implement the STM system. In the following, an STM system with reader-writer locks such as the one described above is presumed to underlie an MCAS implementation in one embodiment. One feature of this embodiment is that the MCAS implementation uses the same reader-writer locks as are used by the STM mechanism.

The implementation in this embodiment has several features. First, the embodiment comprises a generalized implementation of MCAS, in that the embodiment is an implementation that may be expanded to arbitrarily sized set of locations. Second, the embodiment comprises an implementation of MCAS that does not have the excess overhead associated with existing implementations of MCAS due to logging or buffering at intermediate stages of execution. Finally this implementation of MCAS coexists without interference with the underlying STM, because the same locking mechanisms that provide concurrency control and synchronization for the STM are used to implement MCAS, and thus, interference between STM transactions and MCAS operations is unlikely to occur.

Figure 2:
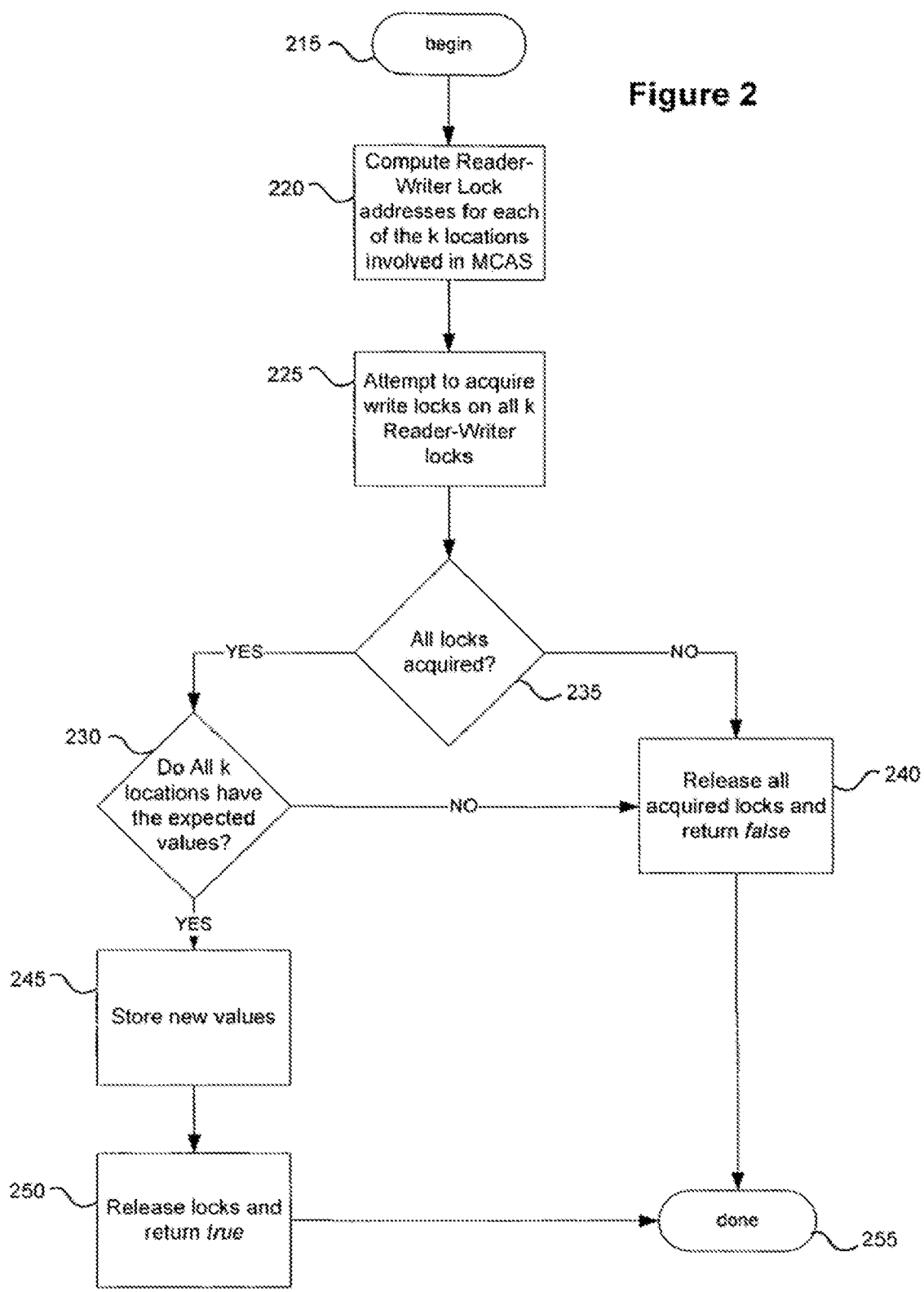
FIG. 2 depicts the flow of processing in one embodiment.

The flowchart in FIG. 2 depicts, at a high level, the implementation of MCAS using an STM mechanism in this embodiment. The figure depicts an implementation of an MCAS primitive which may be considered to have an interface that may be represented as the following function call:

Bool MCAS(int k, void* addr[ ], uint32 oldValue[ ], uint32 newValue[ ]);

This call, which is presented in a C-like syntax, provides a function MCAS which takes as parameters an integer k; a reference or pointer parameter addr which provides the set of k memory addresses that will be used for the MCAS operation; and two value parameters, an array of integers oldValue for comparison, and an array of integers newValue for swapping into the memory array, each of size k When this function executes, the effect is as follows: If the values in the set of memory locations specified through the addresses in addr match the corresponding value in the array parameter oldValue, then the function stores the new values in the array newValue in the set of memory locations specified through the addresses in addr and returns the logical value true; otherwise, the function leaves the memory locations unchanged and returns false.

To achieve the functionality of MCAS, the underlying operation as shown in FIG. 2 begins, 215, by first computing reader-writer lock addresses for each of the k locations involved in MCAS at 220. The implementation then, at 225, attempts to acquire write locks on all k reader-writer locks. If a lock is not acquired at the first attempt, in some embodiments, the implementation may retry lock acquisition a fixed number of times, and a counter may be used to keep track of the number of attempts. If all locks are acquired 235, then the implementation checks if all k locations in the array have the expected values (i.e., those provided in the parameter oldValue). If not all locks are acquired even after retries (if any) (path 235-240), or if not all locations in the array have the expected values (path 230-240), then all acquired locks are released and the function returns a value of false at 240 and terminates, 255. If however, all locks are acquired and the k locations all have the expected values, then the new values in the newValue array are stored at 245, and in this path through the flow, all locks are released at 250 and the function returns the value of true, terminating at 255.

In this embodiment, the actions at 220 in FIG. 2, specifically, the computation of reader-writer locks for the locations involved in MCAS, may be further explained with reference to the mechanism of reader-writer locks described earlier. The implementation of MCAS performs the same actions as the underlying STM system in attempting to acquire a lock. Specifically, just like the STM, implementation of the MCAS call computes the index of a lock in an array of reader-writer locks by starting with the address of each of the k memory locations specified through addr, first masking of the lowest six bits of the address of each memory location to obtain a cache line address for the location; and implementation of the MCAS then uses the cache line address as an index into the array of reader-writer locks.

One feature of the implementation described above is that the embodiment does not require the logging or check pointing of the values in the memory locations specified through addr before the new values are written at 245. This is because when the MCAS implementation reaches 245, several assertions may be seen to be true. First, because parameters old-Value and new Value are passed by value, no address exceptions are likely to occur with reference to those parameters. Because all comparisons are complete, no arithmetic exceptions are likely to occur at this stage. Furthermore, because each address in the k-element set of addresses specified through addr has already been used to compute a cache line address and thus to reference a lock, no access to an address in the array is likely to generate a memory exception because the lock array computation has effectively also validated all the addresses in the array. It may thus be presumed that the storing of new values in the in-memory array will complete without error and thus it is possible to avoid logging or check pointing the old values at this stage, thereby reducing potentially delaying overhead.

While the above description pertains to the above-described embodiment, many variations are possible. First, the MCAS function is typically described, as it is above, with reference to a comparison for equality between a set of values in memory and a set of predetermined values passed to the function, and the values passed into the function are only swapped if each value in the set of memory locations is equal to the corresponding value passed as a parameter. In other embodiments, however, functions similar to MCAS that use comparisons other than equality may be used. Many such comparisons and results are known in the art. For example, an artisan may readily envisage an operation in which the comparison between the in-memory set of locations and the parameter array is a "less than" or a "greater than" comparison, and the swap only occurs if the in memory values are "less than" or "greater than" the corresponding parameter values. Such an MCAS-like function may readily be implemented by processing analogous to that shown in FIG. 2 for MCAS. Other comparisons and actions dependent on the results of the comparison are similarly possible.

Furthermore, the values stored in the arrays may be arbitrary data types, and are not restricted to fixed size data. For example, each element in the arrays could be a text string, graphic image, or other multi-part data type, for which some data-dependent comparison predicate is defined. Thus for example, an MCAS-like operation that swaps out an array of text strings may readily be envisaged.

For generality, all of the above-discussed variations are referred to as MCAS-like in the following.

Furthermore, while the above implementation of MCAS and MCAS-like operations is described with reference to an underlying mechanism that is shared with an STM, the processing described with reference to FIG. 2 may be possible even in the absence of an STM. If an array of reader-writer locks is available that satisfies the requirements of the MCAS operation, the above processing may be implemented despite the absence of an STM in the system. Moreover, in some instances, a hardware-based transactional memory system may provide the locking mechanism required to implement MCAS, in a manner analogous to that provided by the STM implementation in the preceding description of embodiments.

As may readily be understood by one in the art, the actual computation of the reader-writer lock reference based on a memory address may be done in a practically unlimited number of ways, many of which do not relate to the cache line computation described with reference to embodiments referenced above. For example, an arbitrary hashing function and hash table may be used to compute lock addresses and to store the locks for memory locations.

Finally, it should be clear to an artisan that the representative interface to the MCAS function and the processing depicted in FIG. 2 are merely those in one exemplary embodiment. As is known, many variations in syntax and naming are possible in expressing the interface to MCAS, and furthermore processing flow may be altered in an unlimited number of ways without affecting the basic input-output functionality of an implementation of a software functions. Thus, many alternatives to the implementation of MCAS and other MCAS-like primitives discussed above are possible.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process.

Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine readable medium. Any of these mediums may "carry" or "indicate" the design or software information. Thus, a communication provider or a network provider may make copies of an article that constitute or represent an embodiment.

Embodiments may be provided as a program product that may include a tangible machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of tangible media/machine-readable medium suitable for storing electronic instructions. Moreover, embodiments may also be downloaded as a program product, wherein the program may be transferred from a remote data source to a requesting device by way of data signals embodied in a propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising:
   during a transaction, attempting to acquire a write lock provided by an implementation of a software transactional memory (STM) system for each of a set of memory locations of the STM;
   if a write lock is acquired for each of the memory locations, comparing a current value in each memory location of the set of memory locations to a corresponding expected value for each memory location, wherein the current values are application data and not lock pointers;
   if the comparing yields the same, predetermined result for each memory location of the set of memory locations, storing in each memory location a corresponding new value; and
   after storing new values in each memory location, committing the transaction;
   wherein the STM system stores the new values in the memory locations and commits the transaction without recording the current values of the memory locations in a log and without buffering the new values in a buffer for speculative writes.

2. The method of claim 1 wherein:
the comparing further comprises checking if the current value in each of the set of memory locations is equal to the corresponding expected value; and
the predetermined result of the comparison is true.

3. The method of claim 1 wherein attempting to acquire a write lock for each of the set of memory locations further comprises:
if a write lock is not acquired for each of the set of memory locations, increasing a counter of the number of failed attempts;
if the counter is not greater than a predetermined value after, waiting for a period of time, then repeating the attempting to acquire a write lock for each of the set of memory locations; and
if the counter is greater than the predetermined value, aborting the attempt to acquire the write lock.

4. The method of claim 1 further comprising:
if the comparing fails to yield the same, predetermined result for each of the set of memory locations, releasing the acquired write locks.

5. The method of claim 1 wherein the attempting to acquire a write lock for each of a set of memory locations further comprises computing a reference to a unique reader-writer lock for each of the set of memory locations based at least in part on the address of the respective memory location.

6. The method of claim 5 wherein computing the reference further comprises:
computing a hash value based at least in part on the address of the respective memory location;
using the hash value at least in part to obtain a cache line address corresponding to the memory location; and
using the cache line address at least in part to compute an index into an array of reader-writer locks.

7. The method of claim 1 wherein the current values and expected values have an arbitrary-length data type.

8. The method of claim 7, wherein the current values and expected values have a data type selected from the group consisting of a graphic image data type and an arbitrary-length multi-part data type for which a data-dependent comparison predicate is defined.

9. The method of claim 1, further comprising:
before comparing the current value in each memory location to the corresponding expected value, receiving, by the STM system, the new values and the expected values from an application program; and
wherein the operations of attempting to acquire write locks and comparing the current values to corresponding expected values are performed at least in part in response to receiving the new values and the expected values from the application program.

10. A non-transitory machine readable medium having stored thereon data that when accessed by a machine causes the machine to perform a method, the method comprising:
during a transaction, attempting to acquire a write lock provided by an implementation of a software transactional memory (STM) system for each of a set of two or more memory locations of the STM;
if a write lock is acquired for each of the memory location, comparing a first value in each memory location of the set of memory location to a corresponding expected value for the memory location, wherein the first values are application data not lock pointers;
in the comparing yields the same, predetermined result for each memory location of the set of memory location, storing in each memory location a corresponding new value; and
after storing new values in each memory location, committing the transaction;
wherein the STM system stored the new values in the memory location and commits the transaction without recording the first values of the memory locations in a log and without buffering the new values in a buffer for speculative writes.

11. The machine readable medium of claim 10 wherein:
the comparing further comprises checking if the first value in each of the set of memory locations is equal to the corresponding expected value; and
the predetermined result of the comparison is true.

12. The machine readable medium of claim 10 wherein attempting to acquire a write lock for each of the set of memory locations further comprises:
if a write lock is not acquired for each of the set of memory locations, increasing a counter of the number of failed attempts;
if the counter is not greater than a predetermined value after, waiting for a period of time, then repeating the attempting to acquire a write lock for each of the set of memory locations; and
if the counter is greater than the predetermined value, aborting the attempt to acquire the write lock.

13. The machine readable medium of claim 10 wherein the method further comprises:
if the comparing fails to yield the same, predetermined result for each of the set of memory locations, releasing the acquired write locks.

14. The machine readable medium of claim 10 wherein the attempting to acquire a write lock for each of a set of memory locations further comprises computing a reference to a unique reader-writer lock for each of the set of memory locations based at least in part on the address of the respective memory location.

15. The machine readable medium of claim 14 wherein computing the reference further comprises:
computing a hash value based at least in part on the address of the respective memory location;
using the hash value at least in part to obtain a cache line address corresponding to the memory location; and
using the cache line address at least in part to compute an index into an array of reader-writer locks.

16. The tangible machine readable medium of claim 10 wherein the STM system supports first values and expected values having an arbitrary-length data type.

17. The tangible machine readable medium of claim 16 wherein the STM system supports first values and expected values having a data type selected from the group consisting of a graphic image data type and an arbitrary-length multi-part data type for which a data-dependent comparison predicate is defined.

18. The tangible machine readable medium of claim 10 wherein the data enables the machine to perform further operations comprising:
before comparing the first value in each memory location to the corresponding expected value, receiving, by the STM system, the new values and the expected values from an application program; and
wherein the operations of attempting to acquire write locks and comparing the first values to corresponding expected values are performed at least in part in response to receiving the new values and the expected values from the application program.

19. A system comprising:
a processor having a hardware-based transactional memory system;
a memory communicatively coupled to the processor; and
a multi-word compare and swap (MCAS) software module loadable in the memory and operable to perform operations comprising:
  attempting to acquire a write lock provided by the transactional memory system for each of a set of memory locations of the memory;
  if a write lock is acquired for each of the memory locations, comparing a current value in each of the memory locations of the set of memory locations to a corresponding expected value for the memory location, wherein the current values are application data and not lock pointers
  if the comparing yields the same, predetermined result for each memory location of the set of memory locations, storing in each memory location a corresponding new value; and
  after storing new values in each memory location, committing the transaction;
wherein the MCAS software module is configured to store the new values in the memory locations and commit the transaction without recording the current values of the memory locations in a log and without buffering the new values in a buffer for speculative writes.

20. The system of claim 19 wherein:
the comparing further comprises checking if the current value in each of the set of memory locations is equal to the corresponding expected value; and
the predetermined result of the comparison is true.

21. The system of claim 19 wherein the attempting to acquire a write lock for each of the set of memory locations further comprises:
  if a write lock is not acquired for each of the set of memory locations, increasing a counter of the number of failed attempts;
  if the counter is not greater than a predetermined value after, waiting for a period of time, then repeating the attempting to acquire write access for each of the set of memory locations; and
  if the counter is greater than the predetermined value, aborting the attempt to acquire the write access.

22. The system of claim 19 wherein the memory further comprises DRAM.

23. The system of claim 19 wherein the MCAS software module supports write lock management for at least one arbitrary-length data type.

24. The system of claim 23, wherein the MCAS software module supports write lock management for at least one data type selected from the group consisting of a graphic image data type and an arbitrary-length multi-part data type for which a data-dependent comparison predicate is defined.

25. The system of claim 19, wherein the MCAS software module is operable to perform further operations comprising:
  before comparing the current value in each memory location to the corresponding expected value, receiving the new values and the expected values from an application program; and
  wherein the MCAS software module is configured to perform the operations of attempting to acquire write locks and comparing the current values to corresponding expected values at least in part in response to receiving the new values and the expected values from the application program.

* * * * *

UNITED STATES PATENT AND TRADEMARK OFFICE
CERTIFICATE OF CORRECTION

PATENT NO.         : 8,108,627 B2                                    Page 1 of 1
APPLICATION NO.    : 11/395410
DATED              : January 31, 2012
INVENTOR(S)        : Bratin Saha et al.

It is certified that error appears in the above-identified patent and that said Letters Patent is hereby corrected as shown below:

In claim 10, in column 7, line 63, "location" is corrected to state "locations".

In claim 10, in column 7, line 65, "location" is corrected to state "locations".

In claim 10, in column 7, line 67, "data" is corrected to state "data and".

In claim 10, in column 8, line 1, "in" is corrected to state "if".

In claim 10, in column 8, line 2, "location" is corrected to state "locations".

In claim 10, in column 8, line 7, "stored" is corrected to state "stores".

In claim 10, in column 8, line 8, "location" is corrected to state "locations".

In claim 16, in column 8, line 50, "The tangible machine" is corrected to state "The machine".

In claim 17, in column 8, line 53, "The tangible machine" is corrected to state "The machine".

In claim 18, in column 8, line 59, "The tangible machine" is corrected to state "The machine".

In claim 19, in column 9, line 19, "pointers" is corrected to state "pointers;".

Signed and Sealed this
Seventeenth Day of April, 2012

David J. Kappos
*Director of the United States Patent and Trademark Office*